US010943044B2

(12) United States Patent
Chen (10) Patent No.: US 10,943,044 B2
(45) Date of Patent: *Mar. 9, 2021

(54) TRANSIENT AND AC SIMULATIONS WITH TRAVELING WAVE PROBE CIRCUIT

(71) Applicant: INTERNATIONAL BUSINESS MACHINES CORPORATION, Armonk, NY (US)

(72) Inventor: Zhaoqing Chen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/806,397

(22) Filed: Nov. 8, 2017

(65) Prior Publication Data

US 2018/0349537 A1 Dec. 6, 2018

Related U.S. Application Data

(63) Continuation of application No. 15/613,448, filed on Jun. 5, 2017, now Pat. No. 10,803,220.

(51) Int. Cl.
*G06F 30/367* (2020.01)
*G06F 111/10* (2020.01)

(52) U.S. Cl.
CPC ........ *G06F 30/367* (2020.01); *G06F 2111/10* (2020.01)

(58) Field of Classification Search
CPC .. G06F 17/50; G06F 17/5036; G06F 17/5009; G06F 30/367
See application file for complete search history.

(56) References Cited

U.S. PATENT DOCUMENTS 6,066,994 A 5/2000 Shepherd et al.
6,075,498 A 6/2000 Talwar
(Continued)

FOREIGN PATENT DOCUMENTS

| CN | 103605856 A | 2/2014 | |
|---|---|---|---|
| CN | 104809298 | * 7/2015 | ............. G06F 17/50 |
| CN | 105389441 A | 3/2016 | |

OTHER PUBLICATIONS

Wikipedia article "Reflections of signals on conducting lines" archived Dec. 30, 2016, retrieved Jun. 30, 2019. https://web.archive.org/web/20161230155754/https://en.wikipedia.org/wiki/Reflections_of_signals_on_conducting_lines (Year: 2016).*

(Continued)

*Primary Examiner* — Omar F Fernandez Rivas
*Assistant Examiner* — Joshua E. Jensen
(74) *Attorney, Agent, or Firm* — Cantor Colburn LLP; Tihon Poltavets (57) ABSTRACT

Embodiments of the present invention are directed to a computer-implemented method of simulating forward traveling voltages in a simulated circuit. The method includes inserting a traveling wave probe, via a processor, at an observation point of a simulated transmission line. The processor applies a first signal at an input of the traveling wave probe, and evaluates an output of the traveling wave probe. The processor next determines an instantaneous wave forward voltage and an instantaneous wave backward voltage at the traveling wave probe, and displays the instantaneous wave forward voltage and the instantaneous wave backward voltage via an output device.

10 Claims, 7 Drawing Sheets

(56) References Cited

U.S. PATENT DOCUMENTS

| | | | |
|---|---|---|---|
| 6,218,982 B1 | 4/2001 | Shirai et al. | |
| 7,966,140 B1 | 6/2011 | Gholson, III et al. | |
| 8,258,873 B2 | 9/2012 | BuckWalter | |
| 8,554,529 B2 | 10/2013 | Mirgorodski et al. | |
| 2006/0108871 A1 | 5/2006 | Wimmer | |
| 2006/0167666 A1* | 7/2006 | Hsu | G06F 17/5036 |
| | | | 703/2 |
| 2014/0300373 A1 | 10/2014 | Schultz et al. | |
| 2015/0204927 A1 | 7/2015 | Mellitz | |
| 2016/0188775 A1 | 6/2016 | Tanzawa | |
| 2016/0292335 A1* | 10/2016 | Tokuda | G06F 17/5036 |
| 2018/0349536 A1 | 12/2018 | Chen | |

OTHER PUBLICATIONS

List of IBM Patents or Patent Applications Treated as Related; (Appendix P), Filed Nov. 8, 2017; 2 pages.

Zhaoqing Chen, "Transient and AC Simulations With Traveling Wave Probe Circuit", U.S. Appl. No. 15/613,448, filed Aug. 4, 2015.

"VHDL Modeling of Transmission Line Effects in Hardware Designs", IBM TDB n7 12-90 p. 277-285, IPCOM000102643D, Mar. 17, 2005.

David M. Pozar, Microwave Engineering, Fourth Edition, John Wiley & Sons, Inc., 2012, 53 pages.

\* cited by examiner

TRANSIENT AND AC SIMULATIONS WITH TRAVELING WAVE PROBE CIRCUIT

PRIORITY

This application is a continuation of and claims priority from U.S. patent application Ser. No. 15/613,448, filed on Jun. 5, 2017, entitled "TRANSIENT AND AC SIMULATIONS WITH TRAVELING WAVE PROBE CIRCUIT," the content of which are incorporated herein by reference in its entirety.

BACKGROUND

The present invention relates to high frequency circuit modeling, and more specifically, to traveling wave probe circuit modeling for high-frequency circuit transient and alternating current (AC) simulations.

In high frequency circuits and systems, the traveling wave is an important analysis for wave properties like transmission and reflection. In most general purpose circuit simulators, the node voltages are set to be variables to be solved and then displayed. In some high frequency applications, engineers are more interested in observing the traveling wave components. Usually, they need to do some kind of post-processing after the circuit simulation to derive the traveling wave component from the solved node voltages and branch currents.

SUMMARY

Embodiments of the present invention are directed to a computer-implemented method of simulating forward traveling voltages in a simulated circuit. The method includes inserting a traveling wave probe, via a processor, at an observation point of a simulated transmission line. The processor applies a first signal at an input of the traveling wave probe and evaluates an output of the traveling wave probe. The processor next determines an instantaneous wave forward voltage and an instantaneous wave backward voltage at the traveling wave probe, and displays the instantaneous wave forward voltage and the instantaneous wave backward voltage via an output device.

Embodiments also include a system and a computer program product for performing the aforementioned method.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The traveling wave is an important concept in circuit and systems analysis in many applications. Wave properties like transmission and reflection in high frequency circuits and systems are especially important in microwave signal analysis, among other applications. In most general purpose circuit simulators, the node voltages are set to be variables to be solved and then displayed. But for some high frequency applications engineers are more interested in observing the traveling wave components, which currently requires some kind of post-processing after the circuit simulation to derive the traveling wave component from the solved node voltages and branch currents. This secondary process may be cumbersome and time consuming for circuit engineers.

Accordingly, it may be advantageous to use the controlled sources in a simulated signal to represent standard definition equations for wave voltage in real time in both time domain and frequency domain. In some aspects, the circuit model can then display the traveling wave directly in real time while the circuit simulation is running.

Figure 1:
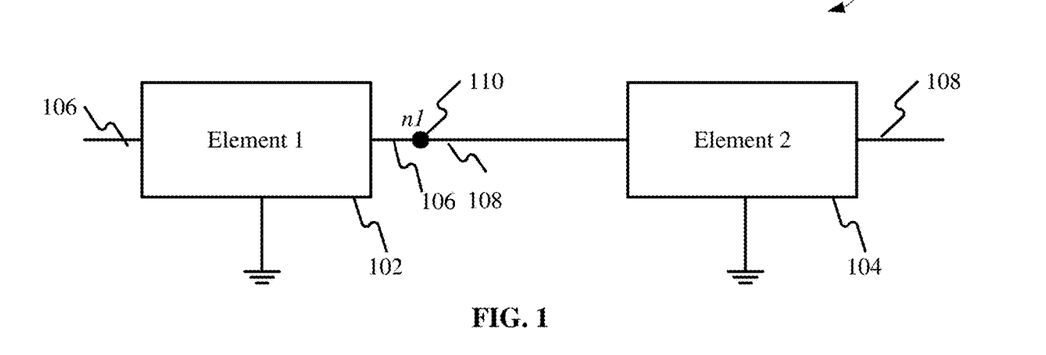
FIG. 1 depicts an exemplary block diagram of a traveling wave circuit simulation according to one or more embodiments.

FIG. 1 depicts a block diagram of a traveling wave line circuit 100. Two components of traveling waves in transmission lines are forward traveling voltage waves ($V_{forward}$) and a backward traveling voltage waves ($V_{backward}$). $V_{forward}$ and $V_{backward}$ are calculated using known equations for wave voltage calculations for forward and backward wave voltage. Using two standard equations, $$V_{forward}=(V_{wire}+i_{wire}*Z_0)/2, \text{ and}$$

$$V_{backward}=(V_{wire}-i_{wire}*Z_0)/2,$$

where $V_{forward}$ the instantaneous forward voltage, $V_{backward}$ the instantaneous backward voltage, $V_{wire}$ is an ideal voltage, $i_{wire}$ is an current, and $Z_0$ is a characteristic reference impedance for the traveling wave on the simulated transmission line. Using conventional methods in circuit simulation, a value for $V_{wire}$ and $i_{wire}$ is obtainable, however it is difficult to separate the traveling waves from the voltage and the current, and it has not been possible to separate the wave current/voltage in real time during the circuit simulation. Accordingly, it is advantageous to create a traveling wave probe 110 for inserting in circuit 100 using a simulation tool that can output a forward wave voltage and a backward traveling wave voltage simultaneously in real time.

As shown in FIG. 1, element 1 and element 2 (block 102 and block 104, respectively) represent ideal transmission line models that reflect voltage waves that propagate through the system according to the equations above. Transmission lines 100 includes an input 106 and an output 108. Element 102 represents a transmission line having a forward-traveling voltage wave and element 104 represents an ideal transmission line having a backward traveling wave. An ideal transmission line is a theoretical construct (or model) of a transmission line having no power loss in transmission. In a physical model, voltage waves travel in one direction in the transmission line and reflect against a load to travel in the opposite direction of the line. According to one or more embodiments, a traveling wave probe may be inserted in the transmission line to observe and measure traveling voltage waves in real time. As shown in FIG. 1, the point labeled n1 represents a traveling wave probe 110, according to embodiments of the present invention.

Figure 2:
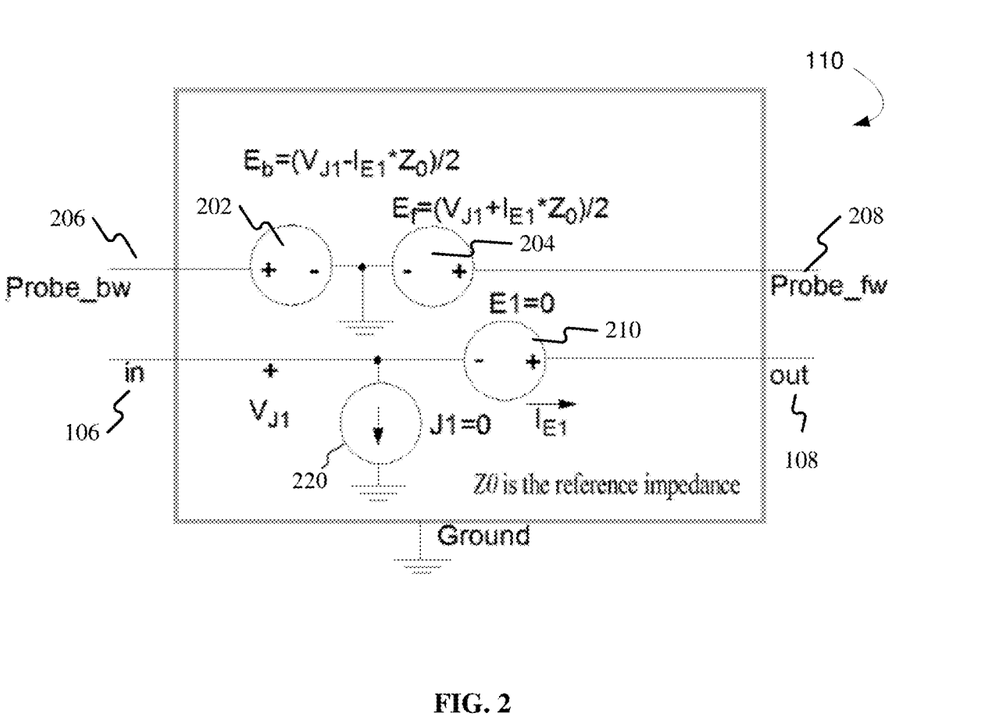
FIG. 2 depicts a traveling wave probe according to one or more embodiments.

FIG. 2 depicts traveling wave probe 110 in greater detail. Referring now to FIG. 2, traveling wave probe 110 (hereafter "probe 110") is inserted in circuit 100. Looking at equations 202 and 204, $Z_0$ is the characteristic impedance of the circuit 100. In a general case, $Z_0$ can be any number, but in practice, the definition is usually 50 Ohm for convenience (as a generalized computational definition). For transmission lines, a characteristic impedance is normally used.

According to embodiments of the present invention, a traveling wave probe circuit is configured to display traveling wave characteristics in real time during the simulation. In some aspects, the instantaneous wave forward voltage and the instantaneous wave backward voltage are determined by a system processor and displayed in real time on an operatively connected output device.

As shown in FIG. 2, probe 110 includes four terminals: probe backward terminal (Probe_bw) 206, a probe forward terminal (Probe_fw) 208, an input terminal 106, and an output terminal 108. Input terminal 106 and output terminal 108 are the terminals of the original circuit 100.

Probe forward 208 is an output probe that will show the forward voltage of the forward traveling voltage wave. Probe_fw indicates an evaluation of a forward wave voltage at output 108. The system processor reads the voltage at probe forward 208 and displays that forward-traveling wave voltage on an output device in real time as the circuit simulation runs.

Probe $b_w$ is a backward probe that indicates an evaluation of a backward wave voltage at input 106. The system processor reads the voltage at probe backward 206 and displays that backward-traveling wave voltage on an output device in real time as the circuit simulation runs.

Voltage source $V_{J1}$ is a controlled voltage source for realizing the two traveling wave voltages $E_b$ and $E_f$. An equation 204 is shown in FIG. 2 that is applied by a system processor to determine an output voltage at output 108. The processor also uses voltage source $V_{J1}$ as applied in equation 202 for determining an input voltage at input 106.

Current source 220 represents a theoretical current for ideal probe 110. The variable J1 represents ideal current source 220 having a current value of zero. The system processor applies this current source (J1) to read voltage $V_{J1}$. The purpose of the current source 220 is to read $V_{J1}$, and E1 is an ideal voltage source 210 with a voltage value of 0 (means it will not disturb original circuit in and out). The purpose is to extract $I_{E1}$ (out).

One aspect of the present invention provides a voltage of the signal at the input 106 of the traveling wave probe 110 and a voltage of the first signal at output 108 of the traveling wave probe 110, where the voltages at both the input and output are identical with respect to one another such that the traveling wave probe 110 does not disturb the input voltage at input 106. Current source 210 (E1=0) and J1=0 means there is no disturbance to the original circuit elements 102 and 104 (which are ideal transmission line models).

Figure 3:
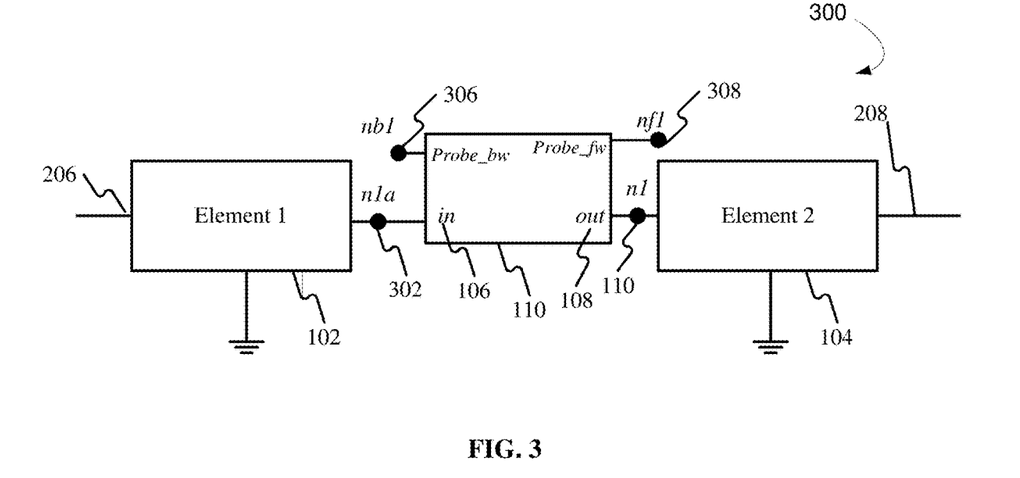
FIG. 3 depicts circuit having traveling wave probe inserted at point according to one or more embodiments.

Referring now to FIG. 3, a circuit 300 is depicted having traveling wave probe 110 inserted at point 302 between element 102 and element 104. As shown in FIG. 3, although probe 110 is inserted between elements 102 and 104, the voltage of the signal at input 106 of traveling wave probe 110 and the voltage of the same signal at the output 108 of traveling wave probe 110 are identical with respect to one another such that traveling wave probe 110 does not disturb the input voltage. That is to say, traveling wave probe 110 is configured to leave the signal undisturbed, and the instantaneous wave backward voltage of the input signal are determined and displayed in real time.

Figure 4:
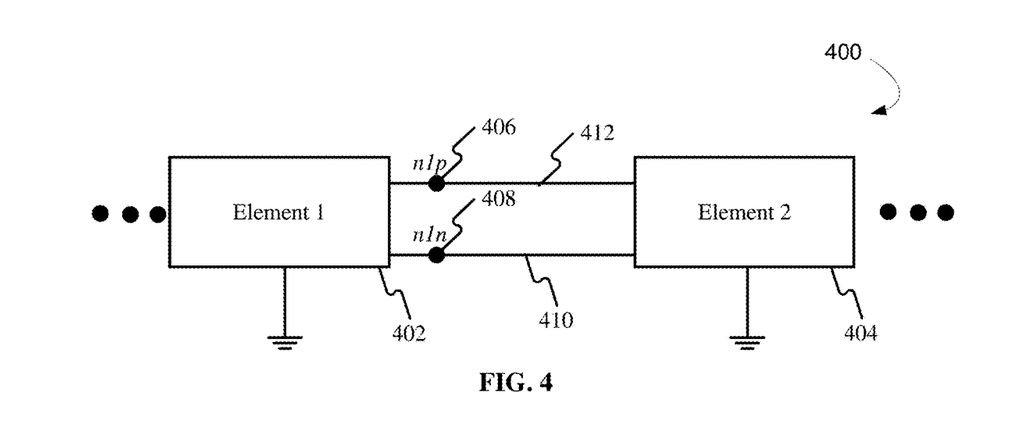
FIG. 4 depicts a circuit having a first element and a second element that receive a plurality of signals according to one or more embodiments.

FIG. 4 depicts a circuit 400 having a first element 402 and a second element 404 that receive a plurality of signals (in the present case, two signals) propagating across transmission lines 410 and 412. Transmission lines 410 and 412 are lossless transmission lines. Nodes n1$p$ (406) and n1$n$ (408) are shown as insertion points for probe insertion.

Figure 5:
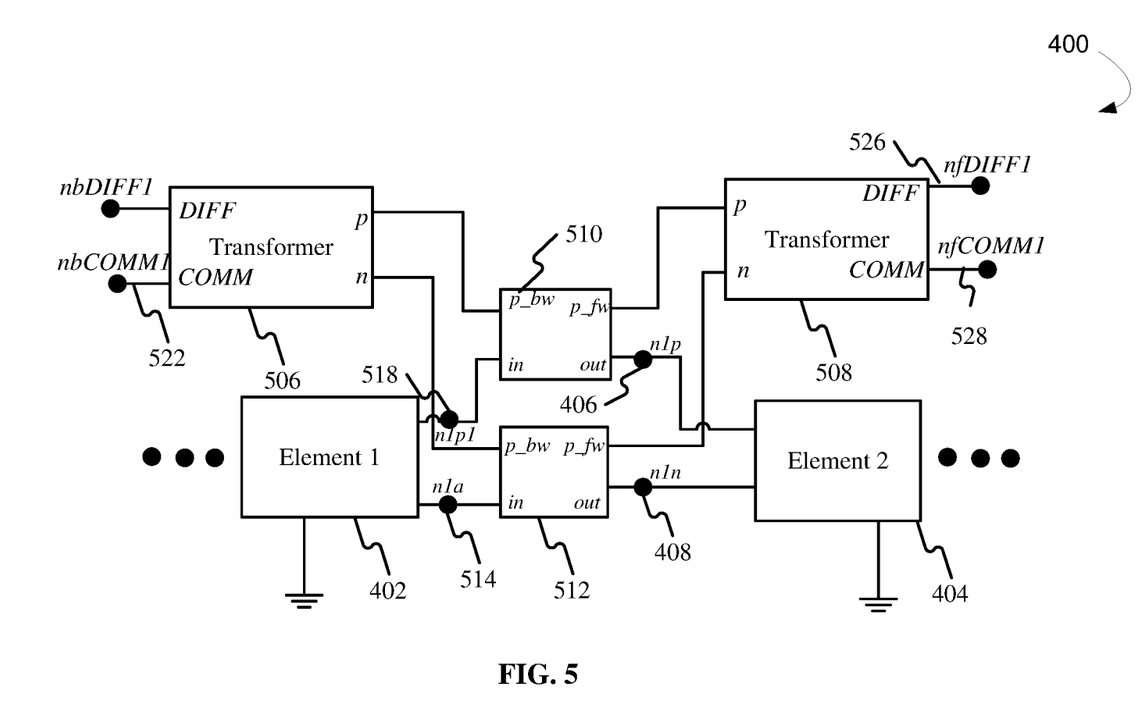
FIG. 5 depicts an exemplary circuit having two traveling wave probes according to one or more embodiments.

FIG. 5 depicts circuit 400 having probes 510 and 512 inserted at nodes 406 and 408. At the output ports of the probes (p_bw and p_fw) two single-ended-mode to mixed-mode transformers 506 and 508 are shown.

Figure 6:
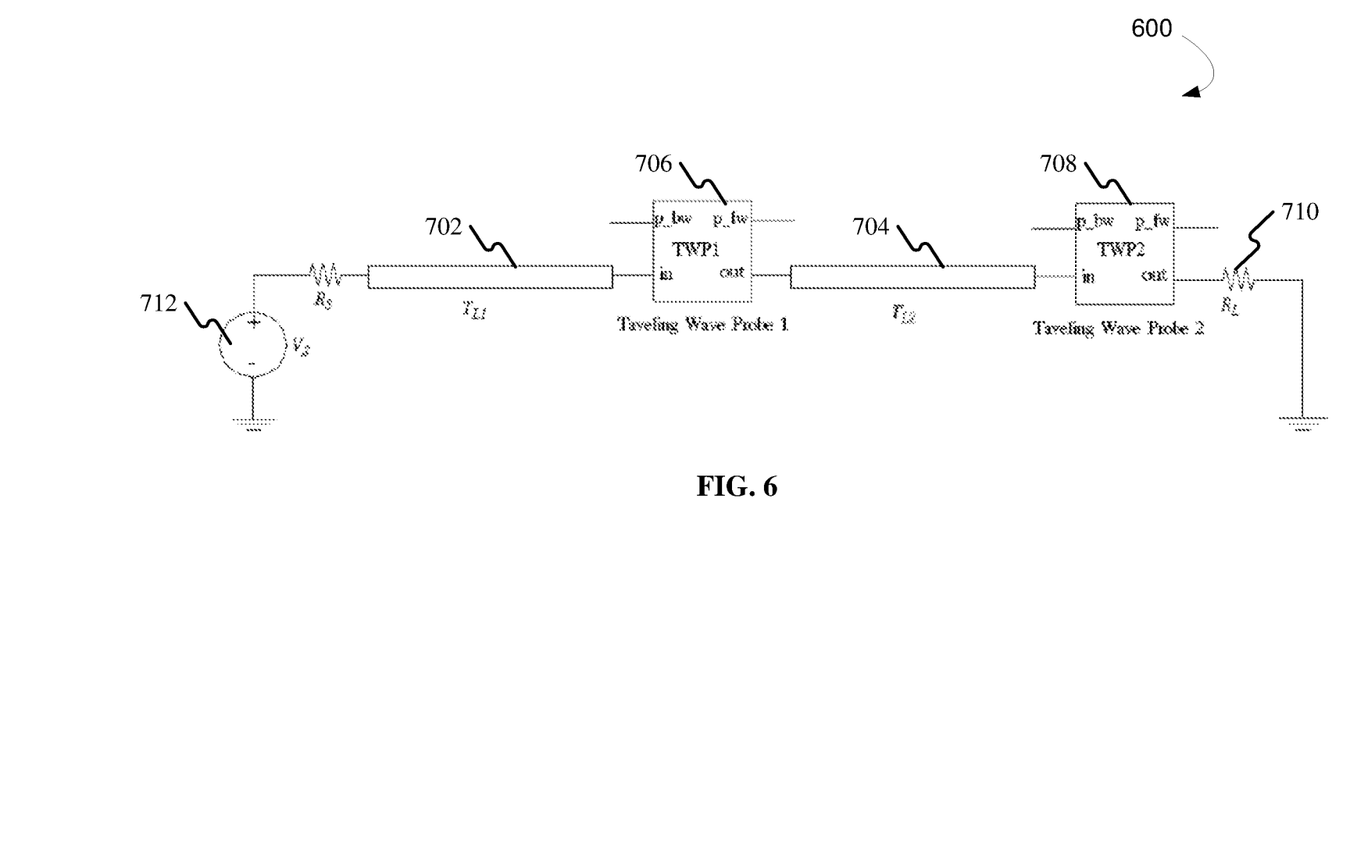
FIG. 6 depicts a circuit having two ideal transmission lines according to one or more embodiments.
Figure 7:
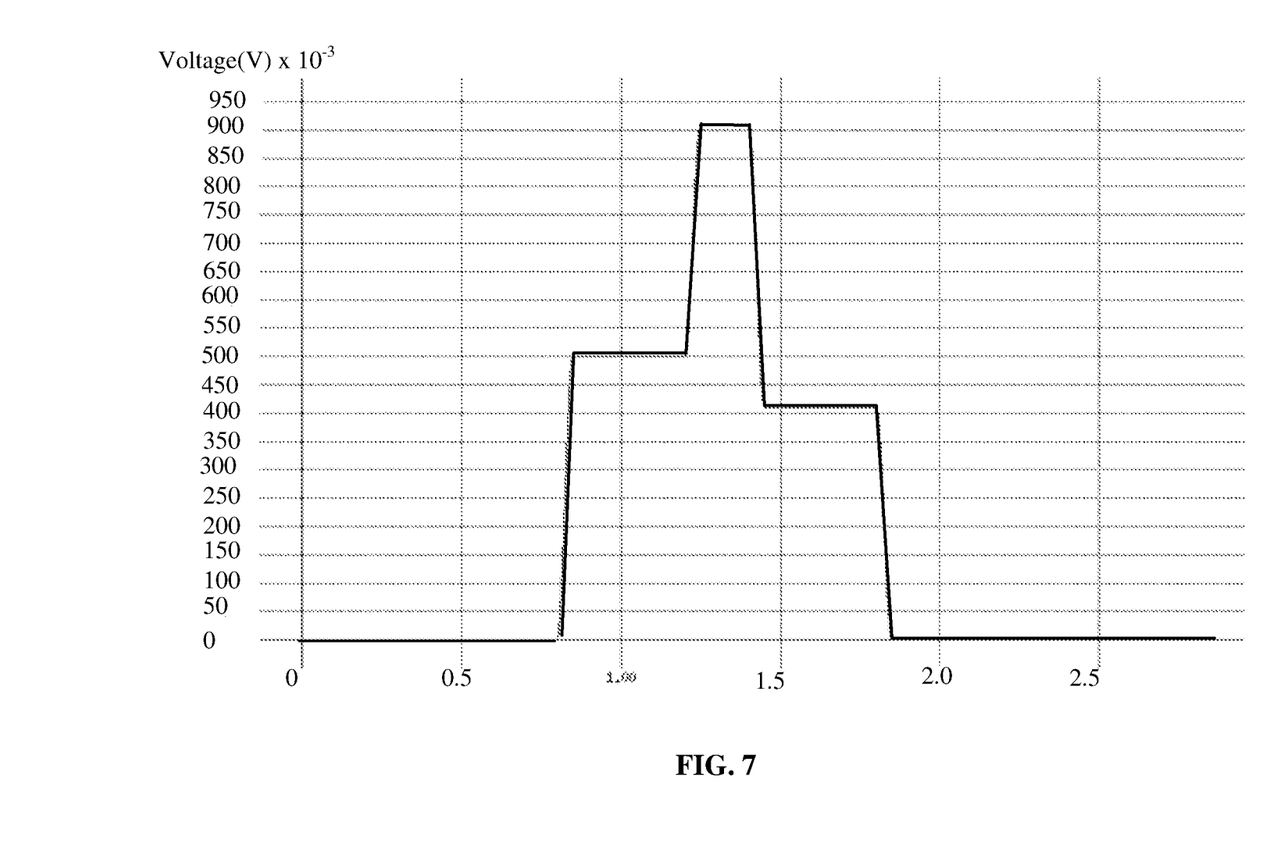
FIG. 7 depicts a graph of a detected reflection.

FIG. 6 depicts a circuit 600 having two ideal transmission lines $T_{L1}$ 601 and $T_{L2}$ 704. FIGS. 6 and 7 will be considered in conjunction with one another. The embodiment shown in FIG. 6 is an exemplary test case having two probes 706 and 708 inserted in the circuit. A very high load (500 Ohm, for example) models an open circuit or very high load. FIG. 7 depicts a real-time output for circuit 600 if probes 706 and 708 were omitted.

Referring first to FIG. 6, two ideal transmission lines $T_{L1}$ and $T_{L2}$ are shown with a voltage source 712 and a load $R_L$ 710. Here we get a traveling wave reflection at the load 710 due to the size of the resistance value. After reflection, the wave travels from the left hand to the right hand side. Although there are two waves reflected back, using conventional methods it is difficult to distinguish the different wave voltages.

Referring briefly to FIG. 7, a graph of the detected reflection is shown as an example using conventional methods. Without the wave probes 706 and 708, we see only a single wave (forward traveling wave voltage). The wave is formed because the high impedance load at load resistor 710 causes a voltage wave reflected back to spike to very high level.

Figure 8:
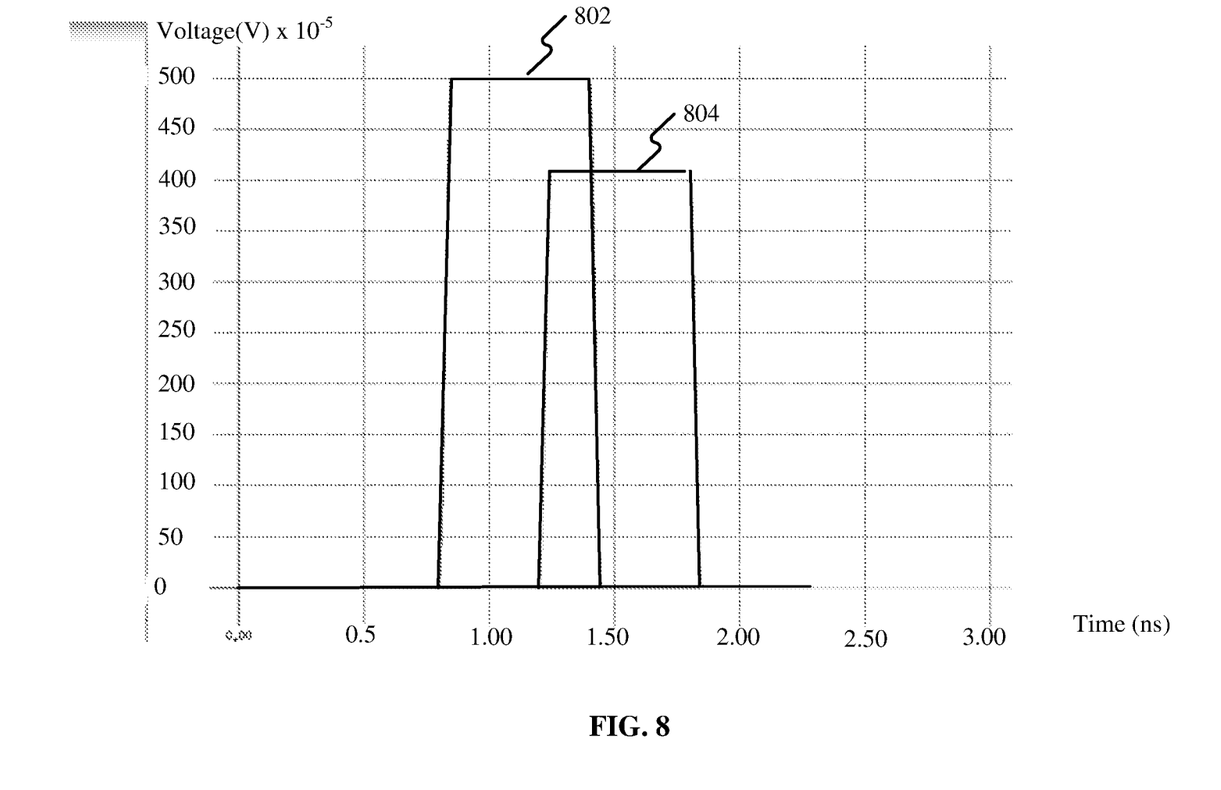
FIG. 8 depicts a forward traveling wave and a backward traveling wave according to one or more embodiments.

By adding traveling wave probes 706 and 708 as shown in FIG. 6, it becomes easy to see the forward and backward traveling voltages as they propagate across transmission lines 702 and 704. FIG. 8 depicts a forward traveling wave 802 and a backward traveling wave 804.

Figure 9:
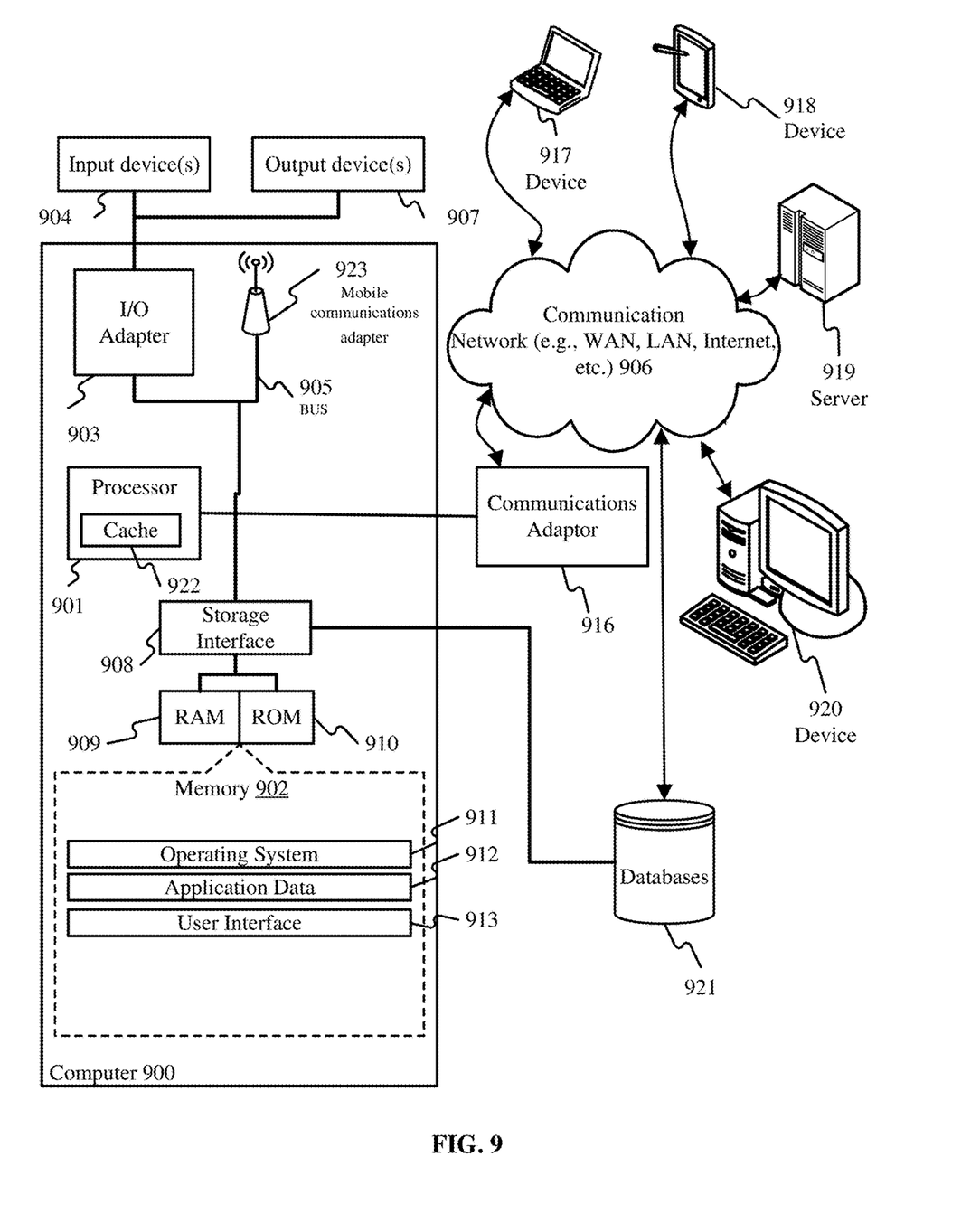
FIG. 9 depicts a block diagram of an exemplary computing environment.

FIG. 9 illustrates a block diagram of an exemplary computing environment and computer system 900 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 900, therefore, can embody a general-purpose computer. In another exemplary embodiment, the implementation can be part of a mobile device, such as, for example, a mobile phone, a personal data assistant (PDA), a tablet computer, etc.

As shown in FIG. 9, the computer 900 includes processor 901. Computer 900 also includes memory 902 communicatively coupled to processor 901, and one or more input/output adapters 903 that can be communicatively coupled via system bus 905. Memory 902 can be communicatively coupled to one or more internal or external memory devices via a storage interface 908. Communications adapter 916 can communicatively connect computer 900 to one or more networks 906. System bus 905 can communicatively connect one or more user interfaces via input/output (I/O) adapter 903. I/O adapter 903 can connect a plurality of input devices 904 to computer 900. Input devices can include, for example, a keyboard, a mouse, a microphone, a sensor, etc. System bus 905 can also communicatively connect one or more output devices 907 via I/O adapter 903. Output device 907 can include, for example, a display, a speaker, a touchscreen, etc.

Processor 901 is a hardware device for executing program instructions (aka software), stored in a computer-readable memory (e.g., memory 902). Processor 901 can be any custom made or commercially available processor, a central processing unit (CPU), a plurality of CPUs, for example, CPU 901$a$-901$c$, an auxiliary processor among several other processors associated with the computer 900, a semiconductor based microprocessor (in the form of a microchip or chip set), or generally any device for executing instructions. Processor 901 can include a cache memory 922, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 922 can be organized as a hierarchy of more cache levels (L1, L2, etc.).

Processor 901 can be disposed in communication with one or more memory devices (e.g., RAM 909, ROM 910, one or more external databases 921, etc.) via a storage interface 908. Storage interface 908 can also connect to one or more memory devices including, without limitation, one or more databases 921, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 902 can include random access memory (RAM) 909 and read only memory (ROM) 910. RAM 909 can be any one or combination of volatile memory elements (e.g., DRAM, SRAM, SDRAM, etc.). ROM 910 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 902 can incorporate electronic, magnetic, optical, and/or other types of non-transitory computer-readable storage media. Memory 902 can also be a distributed architecture, where various components are situated remote from one another, but can be accessed by processor 901.

The instructions in memory 902 can include one or more separate programs, each of which can include an ordered listing of computer-executable instructions for implementing logical functions. In the example of FIG. 9, the instructions in memory 902 can include an operating system 911. Operating system 911 can control the execution of other computer programs and provides scheduling, input-output control, file and data management, memory management, and communication control and related services.

The program instructions stored in memory 902 can further include application data 912, and for a user interface 913.

I/O adapter 903 can be, for example, but not limited to, one or more buses or other wired or wireless connections. I/O adapter 903 can have additional elements (which are omitted for simplicity) such as controllers, microprocessors, buffers (caches), drivers, repeaters, and receivers, which can work in concert to enable communications. Further, I/O adapter 903 can facilitate address, control, and/or data connections to enable appropriate communications among the aforementioned components.

I/O adapter 903 can further include a display adapter coupled to one or more displays. I/O adapter 903 can be configured to operatively connect one or more input/output (I/O) devices 907 to computer 900. For example, I/O 903 can connect a keyboard and mouse, a touchscreen, a speaker, a haptic output device, or other output device. Output devices 907 can include but are not limited to a printer, a scanner, and/or the like. Other output devices can also be included, although not shown. Finally, the I/O devices connectable to I/O adapter 903 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 900 can include a mobile communications adapter 923. Mobile communications adapter 923 can include GPS, cellular, mobile, and/or other communications protocols for wireless communication.

In some embodiments, computer 900 can further include communications adapter 916 for coupling to a network 906.

Network 906 can be an IP-based network for communication between computer 900 and any external device. Network 906 transmits and receives data between computer 900 and devices and/or systems external to computer 900. In an exemplary embodiment, network 906 can be a managed IP network administered by a service provider. Network 906 can be a network internal to an aircraft, such as, for example, an avionics network, etc. Network 906 can be implemented in a wireless fashion, e.g., using wireless protocols and technologies, such as WiFi, WiMax, etc. Network 906 can also be a wired network, e.g., an Ethernet network, an ARINC 429 network, a controller area network (CAN), etc., having any wired connectivity including, e.g., an RS232 connection, R5422 connection, etc. Network 906 can also be a packet-switched network such as a local area network, wide area network, metropolitan area network, Internet network, or other similar type of network environment. The network 906 can be a fixed wireless network, a wireless local area network (LAN), a wireless wide area network (WAN) a personal area network (PAN), a virtual private network (VPN), intranet or other suitable network system.

Network 906 can operatively connect computer 900 to one or more devices including device 917, device 918, and device 920. Network 906 can also connect computer 900 to one or more servers such as, for example, server 919.

If computer 900 is a PC, workstation, laptop, tablet computer and/or the like, the instructions in the memory 902 can further include a basic input output system (BIOS) (omitted for simplicity). The BIOS is a set of routines that initialize and test hardware at startup, start operating system 911, and support the transfer of data among the operatively connected hardware devices. The BIOS is typically stored in ROM 910 so that the BIOS can be executed when computer 900 is activated. When computer 900 is in operation, processor 901 can be configured to execute instructions stored within the memory 902, to communicate data to and from the memory 902, and to generally control operations of the computer 900 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining traveling wave characteristics comprising:
    inserting a traveling wave probe, the traveling wave probe including an ideal current source and a current source, at an observation point within a simulated transmission line;
    applying a first signal at an input of the traveling wave probe;
    evaluating an output of the traveling wave probe;
    determining an instantaneous wave forward voltage and an instantaneous wave backward voltage at the traveling wave probe based on the output in real time; and
    displaying the instantaneous wave forward voltage and the instantaneous wave backward voltage via an output device in real time.

2. The method of claim 1, wherein a voltage of the first signal at the input of the traveling wave probe and a voltage of the first signal at the output of the traveling wave probe are identical with respect to one another such that the traveling wave probe does not disturb input voltage.

3. The method of claim 2, wherein the simulated transmission line is a lossless transmission line.

4. The method of claim 2, wherein the simulated transmission line is a lossy transmission line.

5. The method of claim 1, wherein the traveling wave probe determines the instantaneous wave forward voltage such that:

$$V_{forward}=(V_{wire}+i_{wire}*Z_0)/2, \text{ and}$$

$$V_{backward}=(V_{wire}-i_{wire}*Z_0)/2;$$

wherein $V_{forward}$ is the instantaneous wave forward voltage, $V_{backward}$ is the instantaneous wave backward voltage, $V_{wire}$ is an ideal voltage, $i_{wire}$ is an ideal current, and $Z_0$ is a characteristic impedance for the simulated transmission line.

6. A computer program product for use by a computer in determining traveling wave characteristics comprising:
    computer-readable storage media;
    program instructions disposed on the computer-readable storage media operable upon execution by the computer to define a simulated transmission line having an input terminal and an output terminal and defining a traveling wave probe at an observation point therebetween the input terminal and the output terminal,
    the traveling wave probe including an ideal current source and a current source,
    wherein the program instructions are further operable to apply a first signal at an input of the traveling wave probe and evaluate an output of the traveling wave probe in real time, the output of the traveling wave probe defined by the ideal current source and the current source, and
    wherein the program instructions are further operable to generate a user interface to display an instantaneous wave forward voltage and an instantaneous wave backward voltage based on the output of the traveling wave probe in real time.

7. The computer program product of claim 6, wherein a voltage of the first signal at the input of the traveling wave probe and a voltage of the first signal at the output of the traveling wave probe are identical with respect to one another such that the traveling wave probe does not disturb input voltage.

8. The computer program product of claim 7, wherein the simulated transmission line is a lossless transmission line.

9. The computer program product of claim 7, wherein the simulated transmission line is a lossy transmission line.

10. The computer program product of claim 6, wherein the traveling wave probe determines the instantaneous wave forward voltage such that:

$$V_{forward} = (V_{wire} + i_{wire} * Z_0)/2, \text{ and}$$

$$V_{backward} = (V_{wire} - i_{wire} * Z_0)/2;$$

wherein $V_{forward}$ is the instantaneous wave forward voltage, $V_{backward}$ is the instantaneous wave backward voltage, $V_{wire}$ is an ideal voltage, $i_{wire}$ is an ideal current, and $Z_0$ is a characteristic impedance for the simulated transmission line.

* * * * *